United States Patent [19]
Yates

[11] Patent Number: 5,934,761
[45] Date of Patent: Aug. 10, 1999

[54] BORING MACHINE HAVING HYDROSTATIC BEARINGS

[75] Inventor: David Edwin Yates, Evesham, United Kingdom

[73] Assignee: Rolls-Royce Power Engineering PLC, Newcastle upon Tyne, United Kingdom

[21] Appl. No.: 08/874,337

[22] Filed: Jun. 13, 1997

Related U.S. Application Data

[63] Continuation-in-part of application No. 08/599,179, Feb. 9, 1996, abandoned.

[30] Foreign Application Priority Data

Feb. 17, 1995 [GB] United Kingdom .................. 9503160

[51] Int. Cl.⁶ ............................. F16C 32/06; E21C 1/00
[52] U.S. Cl. ............................. 299/55; 384/110; 299/58
[58] Field of Search ...................... 384/110, 113; 299/31, 33, 55, 58; 405/138, 141

[56] References Cited

U.S. PATENT DOCUMENTS

| | | | |
|---|---|---|---|
| 3,917,366 | 11/1975 | Mason | 384/110 |
| 4,692,062 | 9/1987 | Akesaka | 405/141 |
| 5,618,115 | 4/1997 | Yates | 384/110 |

FOREIGN PATENT DOCUMENTS 1192422  5/1970  United Kingdom .................. 384/113

Primary Examiner—David J. Bagnell
Attorney, Agent, or Firm—Oliff & Berridge, PLC

[57] ABSTRACT

A boring machine having a cutter head rotatably mounted on a hydrostatic bearing. High pressure water is supplied to passageways between confronting bearing surfaces which react axial and radial loads and which are capable of relative rotational movement. The flow of pressurized water discharges from the passageways to prevent contamination of the bearing by the ingress of material removed by the cutter head in operation.

10 Claims, 1 Drawing Sheet

BORING MACHINE HAVING HYDROSTATIC BEARINGS

CROSS-REFERENCE TO RELATED APPLICATION

This application is a continuation-in-part of application Ser. No. 08/599,179 filed Feb. 9, 1996 now abandoned.

BACKGROUND OF THE INVENTION

1. Field of Invention

The present invention relates to a boring machine for producing tunnels or the like.

2. Description of Related Art

Conventional machines used for tunnel boring have a rotating cutter head mounted on heavily loaded bearings. Material removed by the cutter head during the boring operation passes rearwards for removal from the face of the cutter.

A problem with these conventional boring machines is that some of the material removed in the cutting operation penetrates the bearing seals and contaminates the bearings. Debris contamination of the bearing reduces the performance of the reliability of the bearings.

Conventional hydrostatic bearings have bearing fluid distributed to the bearing surfaces via a recess, the recess also acting as a restrictor. U.S. Pat. No. 3,917,366 to Mason discloses a hydrostatic bearing having these features. However, Mason does not teach the use of an expendable bearing medium nor the use of pressurized water as an expendable bearing medium.

The advantage of using an expendable bearing medium is that no filtration system is required and the bearing medium prevents the ingress of contaminants into the bearings. Further, using pressurized water as the expendable bearing medium has the advantage that it acts as a fire retardant and is biodegradable.

SUMMARY OF THE INVENTION

The present invention seeks to provide an improved boring machine in which the bearings are protected from contamination. Protecting the bearings from contamination increases the performance and reliability of the boring machine.

According to the present invention a boring machine comprises a cutter head rotatably mounted on at least one hydrostatic bearing, each bearing incorporating passageways between confronting bearing surfaces which support axial and radial loads, an expendable bearing medium being supplied to the passageways to separate the confronting bearing surfaces to permit relative rotational movement thereof, the expendable bearing medium being discharged from the passageways to prevent contamination of the bearing by the ingress of material removed by the cutter head in operation.

The expendable bearing medium may be fire retardant and is preferably biodegradable. In one embodiment of the present invention the bearing medium is pressurised water.

The confronting bearing surfaces may be conical and the bearing medium may be passed to recesses in the confronting face of one of the bearing surfaces.

DETAILED DESCRIPTION OF PREFERRED EMBODIMENTS

Figure 1:
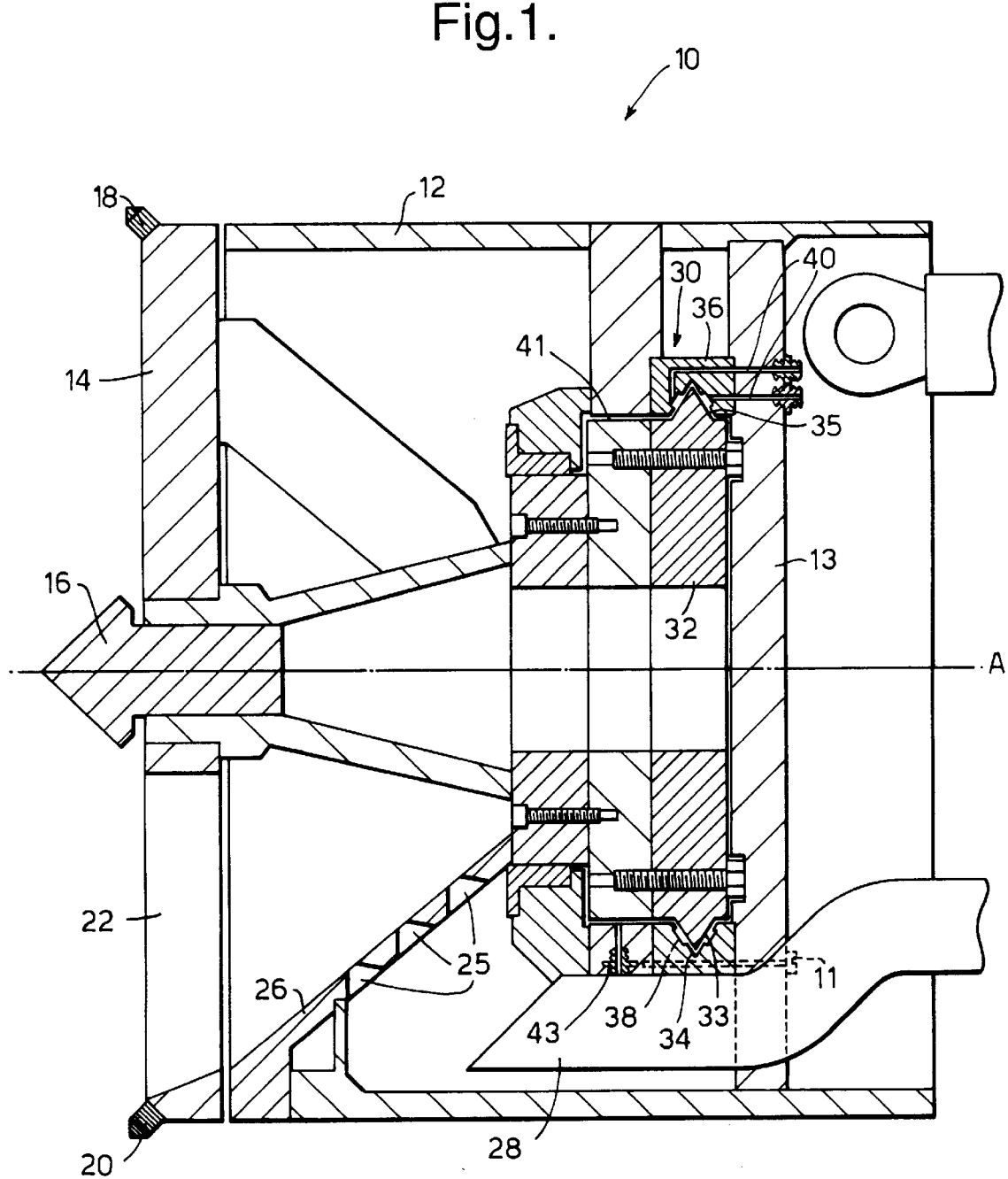
FIG. 1 is a cross-sectional view of a boring machine in accordance with the present invention.

Referring to FIG. 1 a boring machine 10 has a housing 12 and a cutter head 14 mounted on a hydrostatic bearing 30 for rotation about a central axis A. The cutter head 14 has a central cutter cone 16 and two further cutters 18 and 20 mounted at the radially outer edges of the cutter head 14. An opening 22 is provided in the cutter head 14 through which material removed during the cutting operation passes. The material removed during the cutting operation passes through apertures 25 in a grid 26 to a suction duct 28. A vacuum is applied to the suction duct 28 to remove the material which passes through the grid 26 from the machine 10.

The hydrostatic bearing, generally indicated at 30, has an inner ring 32 and an outer ring 36. The outer ring 36 is fixed by fastening means 11 to a support panel 13 mounted on the housing 12 of the boring machine 10. The cutter head 14 is attached to the inner ring 32 for rotation therewith.

Bearing surfaces 33 project from the outer surface of the inner ring 32 and confront bearing surfaces 34 provided in the inner surface of the outer ring 36. The bearing surfaces 33 and 34 are conical and a clearance 35 is provided between them.

In operation when rotation of the cutter head 14 is required the bearing surfaces 33 and 34 are separated by the supply of a pressurised flow of water to the clearance 35. The water is supplied to recesses 38 provided in the stationary outer ring 36 via ducts 40. The pressure of the water in the recesses 38 causes the bearing surfaces 33 and 34 to separate. The water acts as a lubricant to permit rotation of the inner ring 32 relative to the outer ring 36.

The flow of water discharges from the clearance 35 and passes through ducts 41 to a drain 43. The water is expendable and is discharged with the material removed during the cutting operation. That is, the water is led to the material removed during the cutting operation through a passage including the clearance 35, the ducts 41 and the drain 43. Discharge of the water prevents the ingress of material removed during the cutting operation into the hydrostatic bearing 30 and thus improves the performance and reliability of the bearing 30.

It will be appreciated by one skilled in the art that although in the embodiment described water is used as the bearing medium any other expendable bearing medium, liquid or gaseous, could be used. It is envisaged that the expendable bearing medium may be a fire retardant to prevent the risk of a fire during the cutting operation. To prevent pollution of the environment it is further envisaged that the expendable bearing medium is biodegradable.

Although the bearing surfaces 33 and 34 shown are conical they could be of any other orientation provided they support axial and radial loads.

A boring machine in accordance with the present invention may utilise a number of different rotating cutter heads and/or a screw conveyor or an open face discharging the material to a rearward conveyor. Different cutter heads are required depending upon the type of material on which the machine is used.

What is claimed is:

1. A boring machine comprising a cutter head rotatably mounted on at least one hydrostatic bearing, each bearing incorporating passageways between confronting bearing surfaces which support axial and radial loads, an expendable bearing medium being supplied to the passageways to separate the confronting bearing surfaces to permit relative rotational movement of the bearing surfaces, the expendable bearing medium being discharged from the passageways to prevent contamination of the bearing by the ingress of material removed by the cutter head in operation, and a passage leading from the bearing to the material removed by the cutter head, through which the expendable bearing medium is discharged from the bearing into the material removed by the cutter head.

2. A boring machine as claimed in claim 1 in which the expendable bearing medium is a fire retardant.

3. A boring machine as claimed in claim 1 in which the expendable bearing medium is biodegradable.

4. A boring machine as claimed in claim 1 in which the bearing medium is pressurised water.

5. A boring machine as claimed in claim 1 in which the confronting bearing surfaces are conical.

6. A boring machine as claimed in claim 1 in which recesses are provided in at least one of the confronting bearing surfaces to which the bearing medium is provided.

7. A method of using the boring machine claimed in claim 1, comprising:

supplying the expendable bearing medium to the passageways;

rotating the cutter head; and advancing the cutter head along a material cutting path while discharging the expendable bearing medium from the passageways, wherein the expendable bearing medium is not re-supplied to the passageways.

8. A boring machine, comprising:

at least one hydrostatic bearing comprising confronting bearing surfaces which support axial and radial loads and which define passageways therebetween;

a cutter head rotatably mounted on the at least one hydrostatic bearing;

a duct through which material removed during a cutting operation by the cutter head is removed from the vicinity of the cutter head; and a drain in fluid communication with the duct and the passageways;

wherein an expendable medium is supplied to the passageways to separate the confronting bearing surfaces to permit relative rotational movement of the bearing surfaces.

9. The boring machine as claimed in claim 8, wherein the duct is a suction duct.

10. A boring machine, comprising:

at least one hydrostatic bearing comprising confronting bearing surfaces which support axial and radial loads and which define passageways therebetween;

a cutter head rotatably mounted on the at least one hydrostatic bearing; and a duct through which material removed during a cutting operation by the cutter head is removed from the vicinity of the cutter head;

wherein an expendable medium is supplied to the passageways to separate the confronting bearing surfaces to permit relative rotational movement of the bearing surfaces, and is discharged into the duct after passing through the passageways.

* * * * *